United States Patent
Rowe

Patent Number: 5,704,656
Date of Patent: Jan. 6, 1998

[54] ADJUSTABLE PIPE ENTRANCE SEAL

[76] Inventor: John W. Rowe, 2000-B Challenger Ave., Oroville, Calif. 95965

[21] Appl. No.: 669,243

[22] Filed: Jun. 24, 1996

[51] Int. Cl.$^6$ .................................................. F16L 35/00
[52] U.S. Cl. .......................... 285/93; 285/161; 285/206; 285/236; 285/302; 285/38; 285/39
[58] Field of Search .......................... 285/93, 206, 158, 285/161, 235, 236, 302, 38, 39

[56] References Cited

U.S. PATENT DOCUMENTS

| | | | |
|---|---|---|---|
| 3,759,280 | 9/1973 | Swanson | 285/236 X |
| 4,478,437 | 10/1984 | Skinner | 285/236 X |
| 5,027,665 | 7/1991 | Hayward | 285/236 X |
| 5,129,684 | 7/1992 | Lawrence et al. | 285/236 X |
| 5,265,652 | 11/1993 | Brunella | 285/206 X |
| 5,295,760 | 3/1994 | Rowe . | |
| 5,398,976 | 3/1995 | Webb | 285/236 X |

FOREIGN PATENT DOCUMENTS 835239  3/1952  Germany .................. 285/236

OTHER PUBLICATIONS

Publication PM-0104, issue Date Jul. 1, 1994, titled Tank Sump Maual By Environ Products Inc., Lionville, Pennsylvania, U.S.A.

*Primary Examiner*—Dave W. Arola

[57] ABSTRACT

A seal for around a pipe penetrating through a wall. A rubbery reducer boot includes a flexible material-reservoir defined by a material curved-fold allowing a pipe-engaging tubular portion of the boot to be moved outward and inward from a relaxed position, and to be angled in extension relative to a stationary back portion of the boot. An end of the pipe-engaging tubular portion includes areas allowing the application of a hose clamp about the tubular portion to compress against the exterior of a secondary containment pipe adjacent the terminal end of the pipe, and the application of another hose clamp outward beyond the terminal end of the secondary pipe and clamping of the boot about a further-extending primary pipe. The back end of the boot near the material-reservoir includes an annular groove for receiving an annular first end of a tubular fitting assembly. A third and larger hose clamp is positioned about the back of the boot to compress and secure the boot sealed about the tubular fitting assembly. An opposite end of the tubular fitting assembly includes a laterally extending flange for abutting a wall with the annular first end of the tubular fitting assembly passing through a hole in the wall. A seal is provided between the tubular fitting assembly flanged end and the wall, and the boot provides a seal between the tubular fitting assembly first end and the pipe passing through the entrance seal and wall.

20 Claims, 5 Drawing Sheets

ADJUSTABLE PIPE ENTRANCE SEAL

BACKGROUND OF THE INVENTION

1. Field of the Invention

This invention relates to entrance seals for preventing leakage of fluids around pipes at penetration points through walls, particularly in underground installations. The present entrance seal is structured to allow pipes to penetrate walls at a relatively steep angle; is length adjustable inward and outward of the wall along the pipe lengthwise axis, and can serve as a termination seal between a primary fluid-material carrying pipe and an adjacent terminal end of a surrounding secondary containment pipe, and further as an air input termination test reducer.

2. Description of the Prior Art

The most relevant prior art pipe penetration or entrance seals appear to be found in the prior art pertaining to fluid chemical storage and distribution of fluid chemicals through pipes, and for a more specific example, fuel storage and piped fuel distribution systems for gasoline, diesel and the like such as are commonly found at retail gas or service stations. "Fluid" as used in this disclosure means liquid or gasses, or a combination of liquid and gasses that can flow, such as through a pipe. Many if not most underground fuel tanks have a manhole which is accessible from the ground surface through a manhole cover. Many if not most gasoline and diesel dispensers such as at retail service stations have dispenser pans or sumps positioned underneath the dispenser to capture any leaked fluid. Fuel transferring pipes, as well as single walled electrical conduits typically pass through the wall of the manhole for the purpose of connecting equipment within the manhole to equipment outside of the manhole, such as a dispensing pump wherein the fluid carrying pipes pass through the wall of the dispenser pan or sump. Such structuring is not limited to manhole walls, or to fuel storage and piped transferring arrangements, but is also common with other types of chemicals and chemical distribution systems. "Fuel" in this disclosure can be synonymous with "chemical" since fuels are chemicals.

In the example of the manhole and pipes located underground, there is always the risk of ground water leaking into the manhole around the pipes at the penetration points. Leakage of water into the manhole is undesirable since it could damage equipment such as fuel-leak sensors and pumps within the manhole. Leakage of fuel (chemicals) out of the manhole at the pipe/wall junction during a major malfunction is also clearly not desired for environmental reasons.

In modern installations, to help avoid fuel or chemical leakage from the pipe, a secondary containment back-up pipe is often used around the primary material-carrying pipe. If a leak occurs in the primary pipe, the fuel or chemical is captured by the secondary containment pipe and directed by gravity back into the manhole or some other suitable tank or sump like structure for containing the leakage, or is simply captured and contained in the secondary pipe having each end sealed.

Various techniques and structures have been and are currently used to seal around pipes passing through the wall of the manhole or like structure, including welding of the pipes to the wall, and much more commonly today, using flanged fittings and rubbery sealing gaskets and boots affixed to the wall and clamped about the pipe passing through the wall. In my earlier U.S. Pat. No. 5,295,760 issued Mar. 22, 1994, I describe a Testable Bulkhead which includes a flanged rigid tubular insert (body), lock nut, rubbery reducer boots and an air input valve allowing for sealing around a pipe entering through the wall of a manhole. The seal is testable with air pressure to verify its integrity.

In the application of an underground pipe through a wall, such as the wall of a manhole, it is often not quick and easy or even desired to have the pipe pass through a hole in the wall at an angle perfectly perpendicular to the wall and entrance seal, and in underground construction this is due to the ditch in which the pipe is placed not always approaching the wall perpendicularly, or the pipe is intentionally brought through the wall at a slight non-perpendicular angle, such as to allow gravity flow of fluids. This non-perpendicular approach of the pipe to the wall can make it difficult to quickly and effectively apply an entrance seal spanning between the pipe and wall to seal the hole through the wall. Additionally, even if the pipe does pass perpendicularly through the wall, with the underground installation of the pipe and the ditch being back-filled, settling can occur which can move, or at least apply force to shift the pipe in position relative to the wall. In the case of sealing arrangements not allowing sufficient play, this shifting can stress and thus dislodge or tear seals between the pipe and wall.

Another problem in modern chemical and fuel installations wherein primary pipes are covered by outer secondary containment pipes, is in terminating the secondary pipe such as inside a manhole, and allowing the primary pipe to extend further than the secondary pipe, and then conveniently and cost-effectively sealing the open end of the secondary pipe, whether the seal is temporary for air testing or permanently installed to prevent the secondary pipe from draining at that location. The further-extending portion of the primary pipe beyond the secondary pipe allows the connection of the primary to additional equipment such as tanks or pumps and the like, usually with more flexible hoses or conduits. It can, under certain circumstances, be desirable to have one end of the secondary pipe permanently sealed with the opposite end of the secondary pipe left open for draining, or to have both ends of the secondary pipe permanently sealed, or both ends left permanently open. Additionally, it is not only a good idea, but is required in many locations, that the secondary pipe be tested for leaks using air pressure. The testing usually being applied at the initial installation time, and then preferably periodically thereafter. This testing procedure of the secondary pipe requires the sealing of each opposite end of the pipe; at least temporarily for the testing, followed by the application of pressurized air to a given pressure in the pipe, followed by the passage of a given amount of time and then the checking to see if the pressure has dropped. A pressure drop would indicate a possible leak in the secondary pipe, a leak possibly in one of the two end seals, or possibly in the primary pipe, but in any case a situation requiring further inspection, repair and further pressure testing. In the prior art, the sealing of the secondary pipe about the further-extending primary pipe is accomplished by the application of a tubular reducer sleeve usually referred to as a termination reducer, which is separate from the entrance seal sealing about the pipe at the wall penetration, and thus these separate components must be at the installation site and must be installed separately.

Another problem associated with many prior art entrance seals around pipes in underground construction, is in the longevity and ease of replacing certain components of the entrance seal. Once the pipe and entrance seal are initially installed, the ditch is back-filled, rendering the ditch-side of the wall and entrance seal inaccessible absent time consuming and costly digging, usually with manual digging so as to not damage the buried and thus hidden pipe. This inaccessibility of the buried side of the entrance seal can render it very costly to repair a defective part or seal component if the only access to the defective part is by removing the overburden or dirt above the seal, and this can also include removal of asphalt or concrete making it even more expensive. Additionally complicating this seal or component replacement scenario is the fact that most entrance seals utilize annular one-piece components which must be slid on and off of one free end of the pipe, and a free end of the pipe is not immediately available on the outside or ditch-side of the structure wall.

Another problem with many prior art entrance seals is in the amount of time and skill required of a worker to properly install the entrance seal. Entrance seals requiring many holes to be drilled or cut in the wall for the passage of the pipe and for an encircling bolt-pattern for securing sealing gaskets and associated flanges, particularly when different types and sizes of bits or cutting tools, and hand tools are required, and further usually with the multiple holes requiring careful and accurate placement, take a substantial amount of the installer's time, making the installation much more labor intensive, requiring a higher degree of skill and a larger variety of tools on hand. Additional holes in the structure wall also increase the risk of leaks.

Provided in the prior art are entrance seals using rubbery or flexible boots for sealing around pipes passing through structure walls at a relatively steep angle, however, these prior art seals only allow upward, downward, and left and right movement (two axis movement) of the pipe engaging portion of the boot, and do not allow any significant inward and outward seal travel in a third axis toward and away from the structure wall, nor do they provide structuring allowing the entrance seal boot to perform other functions such as serve as a termination reducer for a secondary pipe or as an air input test reducer for in-putting air for testing. Such typical prior art entrance seals are shown on pages 3 and 9 in publication PM-0104, issue Date Jul. 1, 1994, titled "Tank Sump Manual" by Environ Products Inc., Lionville, Pa., U.S.A.. The entrance seals in the "Environ" publication all have many of the above mentioned shortcomings, including requiring multiple holes in the structure wall for the installation of a single entrance seal, no substantial if any inward and outward movement potential, no structuring to provide termination of the secondary pipe terminal end, and no air input valve in a suitable structuring to seal the secondary pipe terminal end and to allow air to be input in the secondary pipe for testing. Additionally with the "Environ" entrance seals, should the water seal portion on the ditch-side of the structure wall, or the flexible boot about the pipe, tear or otherwise become ineffectual, there is basically no way provided to replace the flexible boot or the water seal against the structure wall short of exposing the back or ditch-side of the wall, and then somehow freeing an end of the pipe on the ditch-side of the wall to slip new components thereover.

There is a need for improvements in structural arrangements for sealing around pipe penetrations through walls, and for sealing around piping including a primary chemical carrying pipe covered with a secondary containment back-up pipe. The present invention, as will become appreciated, provides these improvements with a multiple purpose adjustable pipe entrance seal primarily for use in underground installations associated with chemical distribution.

SUMMARY OF THE INVENTION

The following detailed description is of best modes and a preferred structural arrangement of the invention, and there are clearly changes which can be made to that which is specifically herein described and shown, but for the sake of brevity of this disclosure, all of these changes which fall within the scope of the invention have not herein been detailed, but will become apparent to those skilled in the art.

The present invention is an improved entrance seal, primarily for use in underground installations, for sealing a hole surrounding a pipe passing through the hole in a structure wall, although the present entrance seal is structured to perform additional functions. The present entrance seal can also be used for temporarily or permanently sealing a terminal end of a secondary containment pipe positioned over a further-extending primary pipe, and thus can be used as a termination reducer, thus eliminating the need for a separate termination reducer as used in the prior art to perform this function. The present entrance seal can include an air input valve for allowing air to be applied to pressure test and thus verify the integrity of a secondary pipe or both the primary and secondary pipes, thus eliminating the need for a separate test reducer with air valve as used in the prior art to perform this function. Thus, from one vantage point, the present invention provides a multiple purpose sealing unit which can eliminate the use of several components commonly utilized in the prior art.

A somewhat elongated pipe-engaging tube portion of a flexible boot of the present entrance seal is movably adjustable inward and outward of the structure wall (manhole wall for example) and a relatively large diameter wall-seal and boot mount of the entrance seal along a first axis corresponding to the pipe lengthwise axis, which is a convenient feature when also utilizing the entrance seal as a termination or test reducer as will become increasingly appreciated. The pipe-engaging tube of the present entrance seal is movably adjustable upward and downward along a second axis, and movably adjustable left and right along a third axis, and the tube is movably adjustable in all possible combinations within the first, second and third axes. The tube is movably adjustable in position relative to the relatively large diameter wall-seal and boot mount of the entrance seal and the structure wall along three mutually perpendicular axes, and in all possible combinations along these axes, or in other words in three degrees of freedom. Thus, the present entrance seal can effectively seal the hole around a pipe passing through the hole in the structure wall at a relatively steep or non-perpendicular angle to the wall, making it less critical and time consuming for the installer to make sure the pipe approaches and passes through the structure wall perpendicularly, and allowing for intentional sloping of the pipe when gravity flow is desired, while at the same time being capable having the tube moved substantially inward or outward. The entrance seal can be used on a pipe passing through the structure wall at a non-perpendicular angle, and still be length adjustable along the pipe lengthwise axis due to the allowed three degrees of freedom of movement of the pipe-engaging tube. The substantial inward and outward travel potential of the pipe-engaging tube is not only useful to relieve stress on the fluid seals, but is particularly useful when using the front or forward end of the tube as a termination or test reducer, allowing the front end of the tube to be manually pulled or push into position over the secondary pipe terminal end to allow a hose clamp to be applied about the tube over the secondary pipe, and another hose clamp about the tube and over the further-extending primary pipe, wherein both clamps are about the exterior of the tube and sealingly compressing the tube about the respective pipe. The substantial inward and outward movement potential reduces the requirement of placing the terminal end of the secondary pipe a precise distance outward from the structure wall, since within a reasonable distance, usually of 1 to 8 inches for example only, the front end of the pipe-engaging tube can be repositioned to encircle the terminal end of the secondary pipe simply by manually pulling or pushing the tube to move it relative to the piping. This inward and outward substantial movement potential of the pipe-engaging tube also provides the benefit of being able to intentionally place the terminal end of the secondary pipe through the wall but in very close proximity to the wall, and to still be able to seal against the pipe, and to still utilize the tube of the present invention as a termination or test reducer. This close proximity potential use of the present multiple purpose entrance seal allows for sealing, terminating and or testing in an area which is fairly restricted in available space, such as in a small manhole, sump or pan, or one which is quite filled with equipment, which is a fairly common situation. Thus from one vantage point, the present invention provides a multiple purpose entrance seal which is useful in a low-profile or close proximity mode for sealing about the pipe entrance at the structure wall, and for use as a termination reducer and or test reducer, and this is an advantage over the prior art arrangements which use a separate entrance seal and then a separate termination or test reducer applied outward of the entrance seal, an arrangement which normally renders the assembly quite long and extending a substantial distance from the structure wall.

The present entrance seal is structured to be quickly installable, preferably needing only one hole in the structure wall for installation. The present entrance seal is structured to be durable and long lasting, having no exposed components which can be corroded by water on the ditch-side of the structure wall. The present entrance seal allows the easy replacement of all components of the seal, particularly the rubbery seals and any metal parts, which might someday deteriorate with age or become damaged, by positioning such components in areas accessible from an open or accessible side of the structure wall, such as from within a manhole or from the upper exposed side of a dispenser pan or sump beneath a fuel dispenser for example. Rubbery seals and boots, and metal parts such as hose clamps, are normally much more likely to deteriorate with age when compared to good quality rigid plastics, and thus the present entrance seal locates the components most likely to need replacement first with the passage of time on an exposed or accessible side of the structure wall.

The movable adjustability of the position of the pipe-engaging tube is readily provided with a relatively low amount of applied force, and thus the pipe-engaging tube which seals about the pipe passing through the entrance seal can be readily shifted in position, and this provides the significant advantage of stress relief at the fluid seals about the pipe and at the structure wall should the pipe move after installation, such as with a settling ditch or in a earthquake. The stress relief at the fluid seals helps maintain proper sealing should the pipe shift in position after installation.

Some of the objects of the present invention include making the sealing around pipes at structure wall penetrations faster, more positive, more economical, longer lasting, and easier to repair. Other objects are to provide the installer with increased application-choices for varying installation circumstances; greater tolerance for inaccuracies on the part of the installer, such as allowing for pipes to penetrate the structure wall at an angle thereto and allowing the non-precise termination of a secondary containment pipe on the accessible side of the wall; and further for allowing for a degree of pipe shifting to relieve pressure against the pipe and seals about the pipe in a settling ditch or an earthquake. Another object is to allow for choice of seal shapes for engaging the structure wall, as will be come appreciated, seals against the structure wall must sometimes be of differing shapes depending upon the shape of the structure wall, and the present entrance seal allows the seal which engages the structure wall to be readily removed and replaced with another seal or seal shape. Another object of the invention is to provide a multiple purpose entrance seal which can be used to seal about a pipe at the wall entrance, and be used as a termination and or test reducer in a low-profile mode in close proximity to the structure wall.

An entrance seal in accordance with the present invention generally comprises a rubbery reducer boot which has a large diameter at the back end, and reduces downward to have a front end of the boot defined by the pipe-engaging tube which is the approximate diameter of the exterior diameter of the largest applicable pipe. The reducer boot includes a flexible and resilient material-reservoir preferably defined by an annular material curved-fold allowing the reduced diameter pipe-engaging tube of the boot to be moved outward and inward along a pipe lengthwise axis from a normal relaxed position and relative to the stationary large diameter of the boot and structure wall, and this so that the front end of the pipe-engaging tube of the boot can be easily and properly positioned, such as relative to a terminal end of the secondary pipe on the inside of a manhole for example, such as when the present entrance seal is also to be used as a termination reducer for sealing the end of the secondary pipe, or as a test reducer for sealing and air pressure testing of the secondary pipe. The elongated pipe-engaging tube of the boot includes areas allowing the application of a hose clamp about the tube to sealingly compress the tube of the boot against the exterior of the secondary containment pipe adjacent the terminal end of the secondary pipe, and the application of another hose clamp outward beyond the terminal end of the secondary pipe for sealingly compressing the tube of the boot about the primary pipe which extends further than the secondary pipe, an arrangement which prevents the entrance or exit for fluid at this terminal end opening of the secondary containment pipe with the exception of further allowing for testing air to be applied through an optional air valve connected to the tube of the boot between these two hose clamps and in communication with the secondary pipe open terminal end. One of these small hose clamps can be used and be adequate for sealing the tube end of the boot against a single pipe passing through the structure wall, such as an electrical conduit for example, wherein the present invention would be used simply as an improved entrance seal. The back and larger stationary end of the boot near and outward of the material-reservoir includes an annular wall for placement about a relatively large diameter wall-seal and boot mount, which can comprise a first end of a relatively large diameter generally rigid tubular fitting assembly used to sleeve and seal about the hole in the structure wall. A third and larger hose clamp is positioned about the back end of the boot to sealingly compress and secure the boot about the annular first end outer sidewall of the tubular fitting assembly. An opposite end of the tubular fitting assembly includes a laterally extending member, preferably an annular flange, for abutting a structure wall with an annular wall of the fitting assembly in the hole and the annular first end of the tubular fitting assembly located on an opposite side of the wall from the flange. In use, the two oppositely disposed ends of the tubular fitting assembly are positioned on opposite sides of the structure wall. A changeable gasket seal is provided on the accessible side of the wall between the tubular fitting assembly and the structure wall for preventing passage of fluids through the wall hole in any direction and location other than through the pipe passage of the tubular fitting assembly, and the boot provides a seal between the tubular fitting assembly first end and the pipe passing through the tubular fitting assembly and thus prevents passage of fluids through the pipe passage of the entrance seal. Thus, fluid transfer around the pipe through the hole in the structure wall is completely prevented.

The annular material curved-fold defining the material reservoir basically connects the back end of the relatively small or reduced diameter pipe-engaging tube of the boot to the much larger stationary back end of the boot, and this arrangement provides sufficient movement capabilities allowing the tube of the boot to be positioned at a relatively steep angle relative to both the structure wall and the stationary back end of the boot, and without collapsing or substantial kinking or deformation, and thus capable of being co-extensive with and sealing around a pipe penetrating and passing through the structure wall at a relatively steep angle absent the seal about the pipe being under high stress. The wide movement capabilities in three axes or three degrees of freedom of the pipe-engaging tube of the boot provided by the flexible material reservoir allows the pipe to pass through the stationary back end of the entrance seal and the structure wall at a steep angle, and also to shift straight laterally toward the structure wall after installation, such as with a settling ditch, without the seal between the structure wall and pipe being lost, and further allowing the tube to be readily positioned to serve as a termination or test reducer sealing the end of a secondary pipe. Thus, stress relief for the pipe and seals, as well as angular adjustability, and lateral pipe movement, and further, inward and outward movement capabilities of the pipe-engaging tube portion is provided by suspending the pipe-engaging tube generally within the substantially larger interior diameter of the tubular fitting assembly using highly flexible, preferably curved shaped material connecting between the much larger back-end portion of the entrance seal boot sealingly engaged to the tubular fitting assembly, which in turn is sealingly engaged with the structure wall. The curved-fold material defining the material reservoir provides a large amount of flexible and resilient material in a relatively small space.

These, as well as other objects, advantages and attributes of the invention will be increasing appreciated with continued reading and with review of the drawings.

BEST MODE FOR CARRYING OUT THE INVENTION

Figure 1:
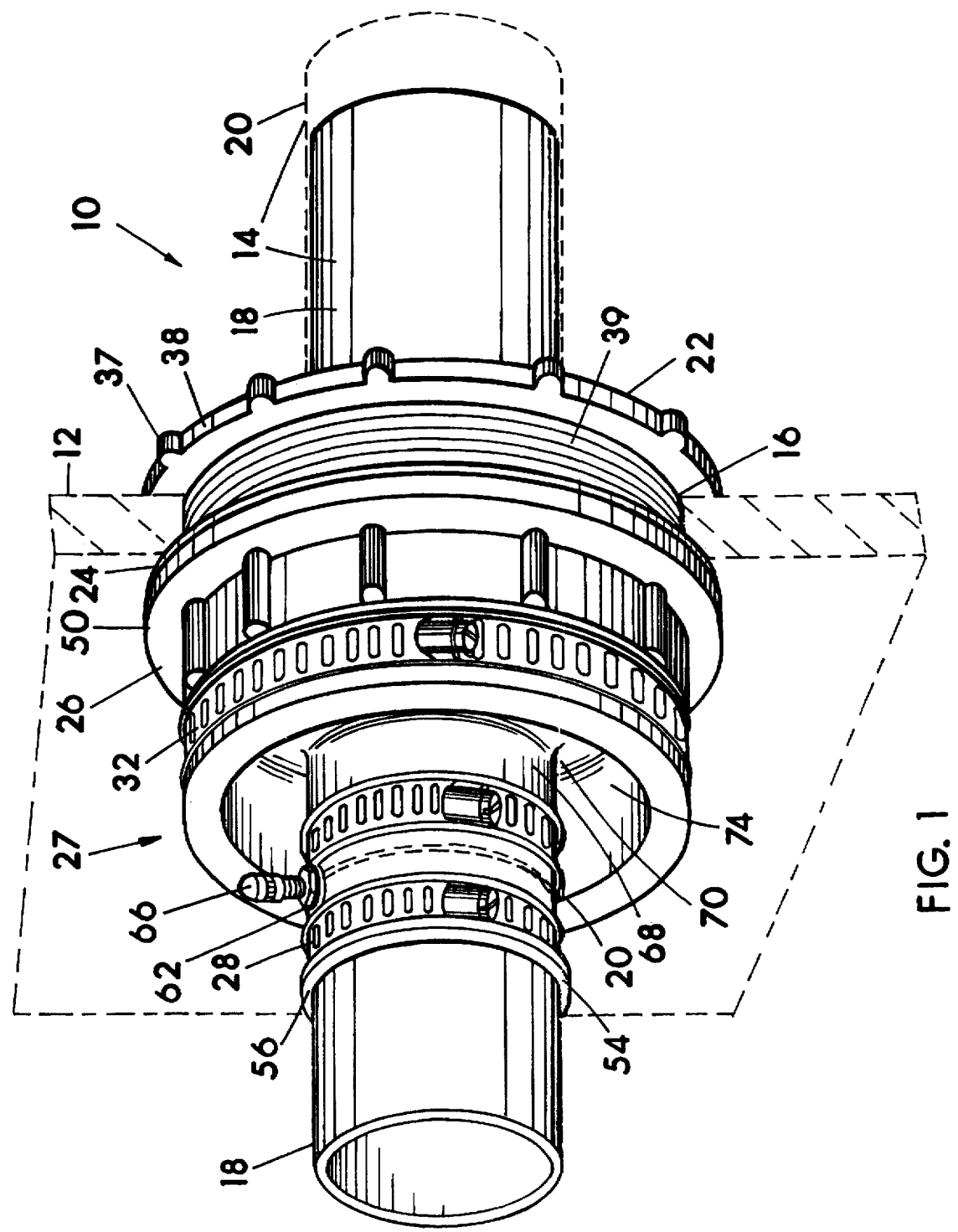
FIG. 1 is an assembled in-use view of a structural preferred embodiment for example in accordance with the present invention on a structure wall and sealing about a pipe structure passing through a hole in the structure wall.

Referring now to the drawing in general for a detailed description of how to build and use at least one preferred structural embodiment, designated entrance seal 10, in accordance with the present invention. It should be understood that some changes in the specific structure described with reference to entrance seal 10 can be made without departing from the true scope of the invention, but in the interest of brevity of this detailed description and with the assumption those skilled in the art will become aware of many of the potential changes upon reading this description, many of the possible changes will not herein be detailed. Additionally, dimensions given in inches or portions thereof are for example only, as I do not necessarily wish the invention to be restricted to these dimensions which I provide for example.

FIG. 1 is an assembled in-use view of a structural preferred embodiment of entrance seal 10 in accordance with the present invention on a structure wall 12 and sealing about the exterior of a pipe or a pipe structure 14 passing through a hole 16 in the structure wall 12. The sealing by seal 10 is between the exterior of the pipe structure 14 and the surrounding structure wall 12 so as to seal the hole 16 against the passage of fluids in either direction through the penetration through the structure wall 12. In this drawing, pipe structure 14 comprises a primary pipe 18 and an outer secondary pipe 20, with secondary pipe 20 shown in broken lines for clarity of the other shown components. In this example, secondary pipe 20 fits in close proximity to primary pipe 18, and a small open space or channel exists between the interior surface of pipe 20 and the exterior of primary pipe 18 so that fluid leaked from the primary pipe 18 can flow between the two pipes 18 and 20.

Figure 2:
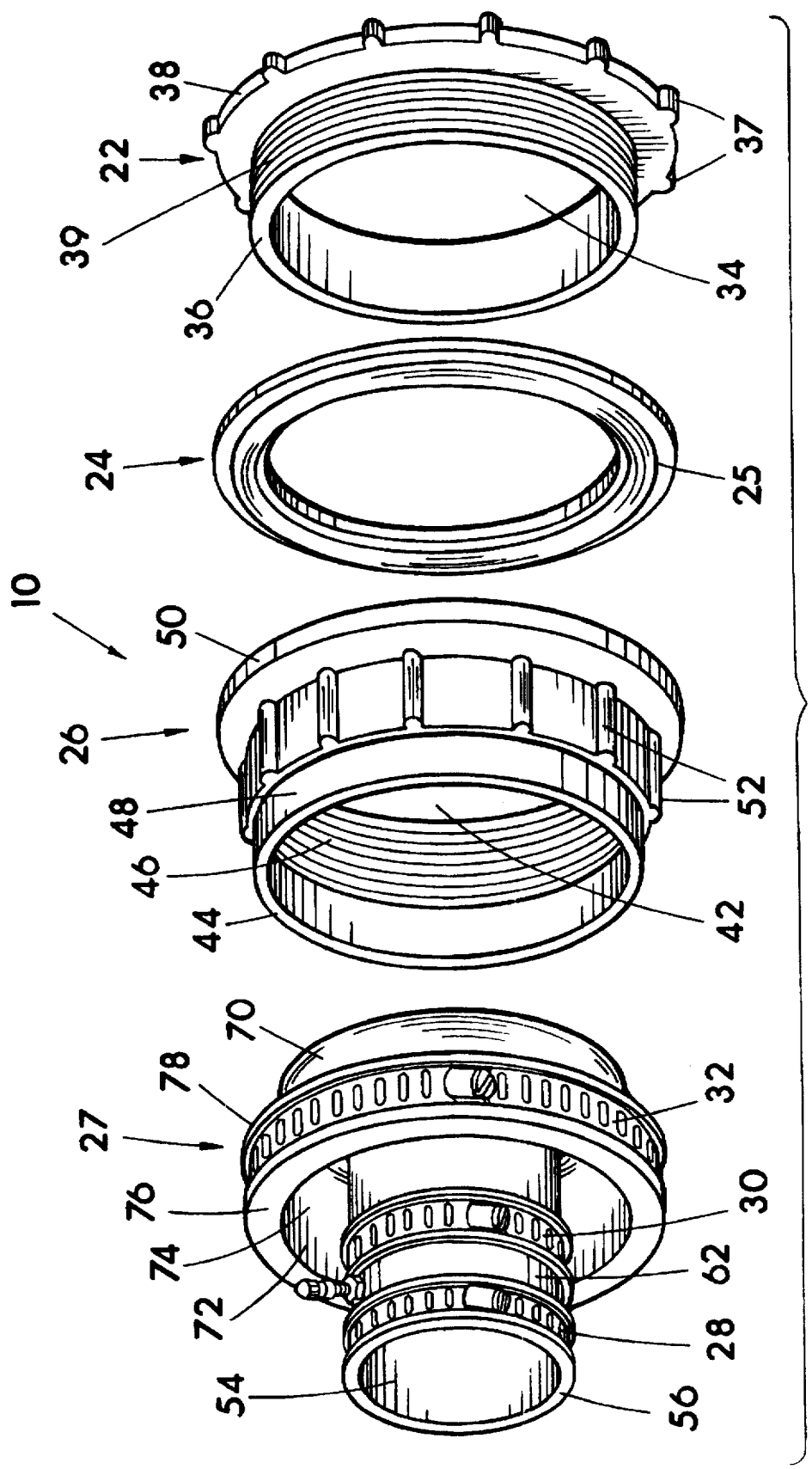
FIG. 2 is an exploded perspective view of component parts of the FIG. 1 preferred embodiment.

FIG. 2 is an exploded perspective view of the component parts of entrance seal 10. Entrance seal 10 includes the tubular fitting assembly which basically constitutes a hole sleeving arrangement and means for sealing about the hole 16, and which in this example basically comprises a tubular rigid body 22, a rubbery circular seal 24, and a specialized rigid elongated tubular nut 26. The tubular fitting assembly basically sleeves a hole 16 in a structure wall 12, seals about the hole 16 against passage of fluids through the hole 16 in any direction and location other than through the pipe passage of the tubular fitting assembly, and provides a stationary anchor with open central pipe passage to which to sealingly connect the large end of rubbery boot 27 with the opposite end of boot 27 sealingly connected to a pipe passing through the center of the tubular fitting assembly, and thus sealing against the passage of fluids through the hole 16 byway of moving through the open center of the tubular fitting assembly along the pipe. The pipe passage through the tubular fitting assembly is defined by the aligned passages through body 22 and nut 26, and the pipe passage through entrance seal 10 is defined by the aligned passages through body 22, nut 26 and boot 27 or specifically tube 54 of boot 27. The passages are all defined by an annular wall of the respective components. Entrance seal 10 includes the rubbery reducer boot 27, and in this example the three individual adjustable hose clamps including a small hose clamp 28, another small hose clamp 30 which can be the same size or larger as clamp 28, and a third and larger hose clamp 32. Additional features on each of these components will be detailed.

Body 22 comprises a rigid tubular structure having a relatively large interior diameter passage 34 compared to any pipe of proper diameter for insertion through passage 34 of body 22, the large diameter of interior passage 34 of body 22 allowing the smaller pipe to pass through the center of the body 22 at a steep angle, for example, 10 to 30 degrees in angle. Body 22, or more specifically a portion of wall 36 of the body fits in-part within hole 16 of structure wall 12 to sleeve the hole 16. Body 22 is preferably made of rigid plastics for cost and shipping weight considerations, and because plastics are generally not corroded by water, although body 22 could be made of other materials such as metal of a type or plated to not be subject to rapid rusting, and body 22 can be injection molded or machined from a block of material, or can be manufactured with a combination of molding or casting and machining. Body 22 is a tubular structure having the open or hollow passage 34 for allowing the free passage of a pipe through the hollow passage, the pipe passing from one side of the structure wall 12 to the other through the center passage 34 of body 22. As will be increasingly appreciated, passage 34 should have a substantially larger open diameter than the exterior diameter of the pipe or pipe structure 14 inserted through passage 34, and this allowing the pipe to pass through body 22 at an angle; the pipe to move or shift somewhat with a settling ditch, and also allowing a given size of body 22 to be used on a variety of similar pipe diameters, with differently and appropriately sized pipe-engaging tube 54 diameters on rubbery boot 27 as will become appreciated, although a given size of tube 54 can be compressed onto smaller diameter pipes, and stretched over larger diameter pipes to a degree. The hollow passage 34 is defined by annular wall 36 having threads 39 on the exterior thereof for receiving and engaging threads 46 on nut 26. What is considered the first end of annular wall 36 simply terminates absent any substantial diametrical changes, and what is considered the second or back end of annular wall 36 has a laterally extending annular flange 38 as can be seen in FIG. 2. Flange 38 is preferably integrally connected to wall 36 in the manufacturing of body 22, but conceivably could be connected such as by welding or using adhesives in a secondary step, or possibly be attached by a threaded connection. Flange 38 connected at the second terminal end of wall 36 extends laterally outward a sufficient distance to serve as a stop or abutment member or shoulder to prevent the complete passage of the body 22 through a properly sized hole 16 in structure wall 12 sized to allow passage of body wall 36. In this situation, hole 16 is just slightly larger than the major external diameter of wall 36 with threads 39, and flange 38 extends laterally a distance to prevent passage of the flange 38 through the hole 16, and thus the front end of body 22 can be inserted into a hole 16 and flange 38 prevents further movement of the body 22 through the hole 16. Body 22 is inserted into hole 16 prior to the passing of the free end of the pipe through the hole 16, or alternatively, the body 22 is placed over the free end of the pipe and then the free end of the pipe is inserted through hole 16 followed by sliding the body 22 and inserting it into the hole 16. One hole 16 through structure wall 12 is the only hole necessary for the application of entrance seal 10 about a single pipe passing through the hole 16. Since flange 38 serves as a stop in this situation, the flange need not necessarily be fully annular, but instead could be multiple laterally extending tabs sufficient to abut the side surface of the structure wall 12 in accordance with the invention. The outer periphery of flange 38 is shown with extending knobs 37 useful for grasping by hand or with a wrenching or hand-tool when tightening the threaded engagement between the threads 39 of body 22 and the threads 46 of nut 26. Additionally it should be noted threads 39 extend the full length of wall 36 of body 22, and if one knew the thickness of the structure wall 12 in which the body 22 was to be applied, the threads 39 could terminate prior to reaching flange 38, since the threads are not utilized within the thickness of structure wall 12, but since the body 22 should be made for a variety of structure wall 12 thickness, threads 39 are carried in this example up to flange 38 to allow the body 22 to be used on very thin structure walls 12. The material of which body 22 is manufactured should be impervious to the passage of water and any fluid desired to be contained, should be strong and long lasting, should be durable in the application anticipated temperature range, and should be resistant to deterioration by, and the passage of, any chemicals or agents anticipated to come into contact with the body 22. For use such as with gasoline and diesel petroleum products, body 22 can be formed of an acetal based plastics material, although other suitable materials could also be utilized. Although not shown, it should be noted that flange 38 or body 22 could be made with a collar or short annular wall extending away from flange 38 in order to allow the sealed application of a reducer boot from the body 22 to the pipe on the outside or ditch-side of the wall, and this would be for testing the seal against the wall with air pressure. In this wall-seal testing arrangement, a seal would also need to be located between flange 38 and the wall, similar to that taught in my prior Pat. No. 5,295,760.

Figure 3:
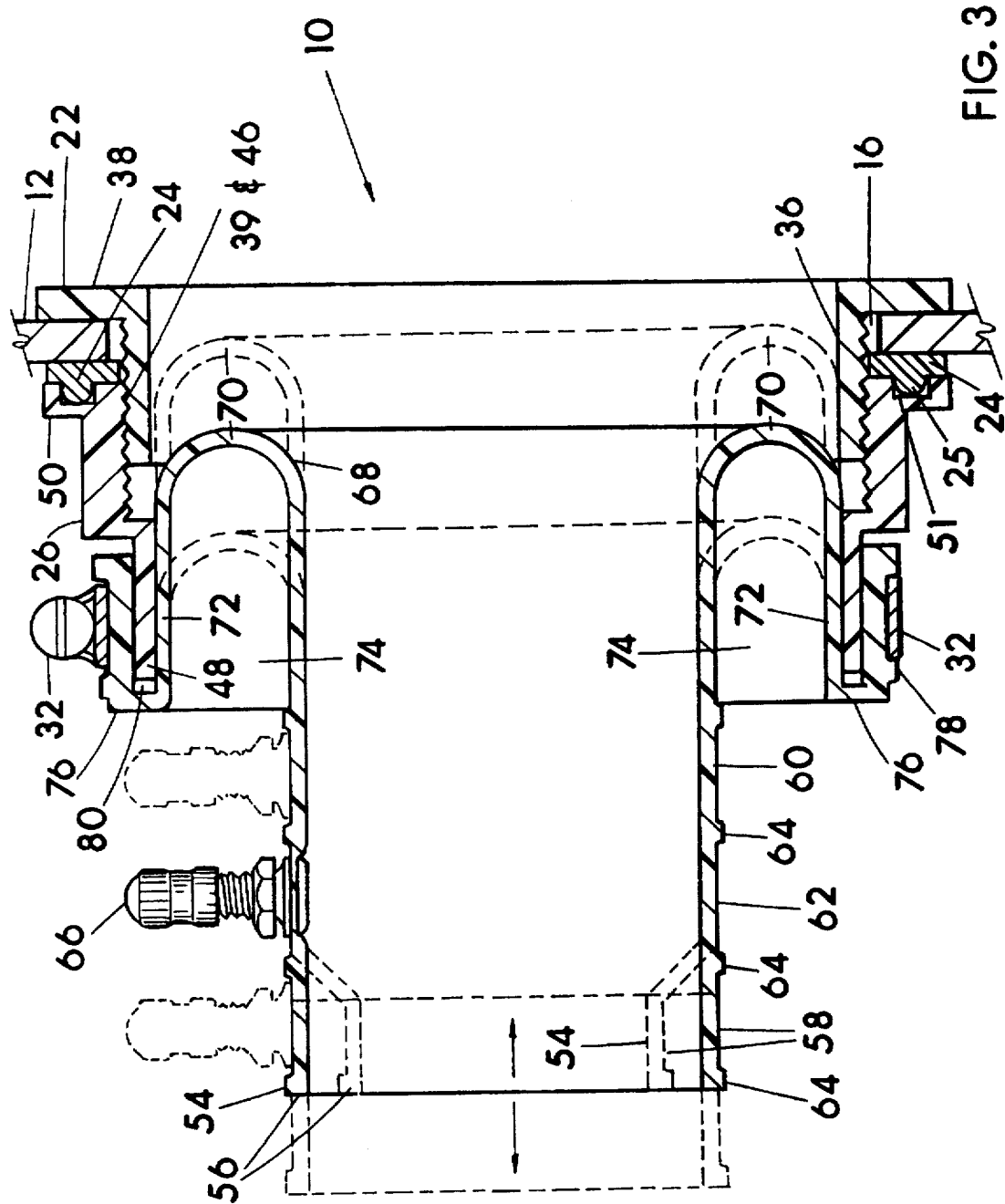
FIG. 3 is a cross sectioned side view of the preferred embodiment of FIG. 1 with broken lines indicating length adjustment capability of the rubbery boot. A structure wall with hole therein is shown sealingly sandwiched between the changeable seal and a flange arrangement of the tubular fitting assembly.
Figure 5:
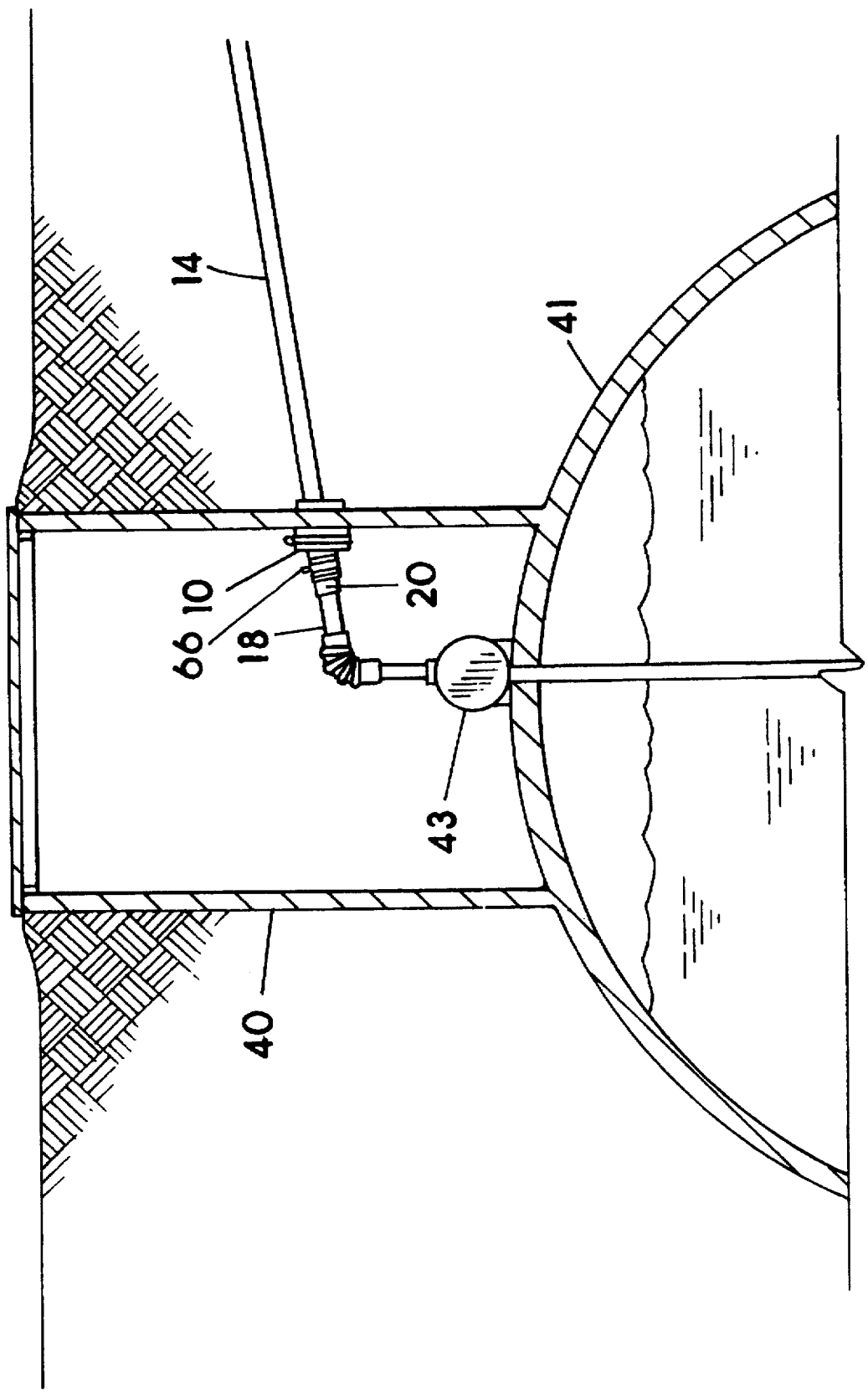
FIG. 5 is a side view of the preferred embodiment of FIG. 1 shown affixed over an underground pipe passing through a structure wall of a manhole above an underground fuel tank. The pipe structure is shown passing through the structure wall at a non-perpendicular angle to the structure wall and to the back or nearest portion of the entrance seal to the structure wall.

Circular seal 24 is an annular ring of soft rubbery material having an interior open diameter sufficiently large to slip over the external diameter of body wall 36 and threads 39 so that the circular seal 24 can be positioned about wall 36 and near flange 38, but during use is compressed against the opposite side of the wall 12 from flange 38. Circular seal 24 serves as a fluid seal preventing passage of water or fluid from one side of structure wall 12 through wall hole 16 to the other side of the wall 12 in all directions and areas except for through the central main pipe passage through the tubular fitting assembly. Since boot 27 is intended to be located on an accessible side of structure wall 12, such as inside a manhole 40 as shown in FIG. 5, circular seal 24 is also located on an accessible side of structure wall 12, and this means this circular seal 24 should be positioned on the same side of structure wall 12 as boot 27 and compressed and sealingly engaged against structure wall 12 by the back end (flange 50) of nut 26. The washer-like resilient body of circular seal 24 is compressible, impervious to the passage of water, and capable of spreading outward somewhat under compression applied by nut 26. When water or another fluid leaks around the abutting flange 38 and structure wall 12 and travels along the engaged threads 39 and 46, the fluid will exit in the interior of body 22 at the seam between body 22 and nut 26 effectively on the same side of the structure wall 12 as flange 38, and thus the fluid will be effectively prevented from traversing the structure wall 12 as can be ascertained from FIG. 3. Circular seal 24 prevents the passage of fluid outward or inward between the interfacing surfaces of structure wall 12 and the back end flange 50 of nut 26, again, as can be ascertained from FIG. 3. The material of which circular seal 24 is manufactured should be impervious to the passage of water, should be long lasting, should be durable and useful in the application anticipated temperature range, and should be resistant to deterioration by, and the passage of, any chemicals or agents anticipated to come into contact with the circular seal 24. For use such as with gasoline and diesel petroleum products, circular seal 24 can be formed out of rubbery material such as a thermoplastic elastomer sold under the tradename of ALCRYN by the E. I. Du Pont Company, although other suitable materials can also be used. Circular seal 24 can be round in cross-section, or it can be somewhat flat sided in cross-section. For larger diameter seals 24 used on structure walls which are curved and have a relatively small diameter, circular seal 24 can be shaped with a varying wall thickness to be curved to fit the curvature of a wall 12 so as to better conform and seal against the structure wall 12. Circular seal 24 can also be made or shaped to be captive, such as in part resting in a groove 51 in the back side of flange 50 as shown in FIG. 3 to help retain the seal in place during rotation of nut 26 relative to body 22. Circular seal 24 is preferably removable from flange 50, and this so that an installer can choose a circular seal of his choice, such as a standard O-ring shaped seal, a varying thickness type seal for use with curved structure walls 12, or a wide flat surfaced seal such as that shown in FIG. 3 for use with relatively rough surfaced walls 12. The seal 24 shown in FIG. 3 is shown with a annular back extension inserted into the groove in flange 50, and thus is considered captive, but is intentionally removable by pulling the seal forward out of the retaining groove. Circular seal 24 could be adhered to the back end of nut 26 or flange 50, but this is less preferred since it is a significant advantage to allow an installer to choose and utilize the seal 24 shape most appropriate for the installation criteria, without having to carrying or stock numerous nuts 26 each with permanently attached seals 24 of different types and shapes. Nuts 26 are relatively bulky and expensive compared to seals 24 of differing shapes, and thus it is less costly and consumes less space on a service truck to stock different shapes of seals 24 as opposed to many nuts 26 each with a permanently affixed seal 24. A single nut 26 in accordance with the present invention can be used with numerous shapes of circular seals 24. Seal 24 being removable from the nut 26, and removable from the inside or accessible area of a structure such as within a manhole, allows the seal 24 to be replaced should it become damaged or defective without having to supply a new nut 26. A tongue 25 on the backside of seal 24 fits into the groove 51 in flange 50, and the seal 24 is retained laterally captive, an arrangement which prevents the seal from wandering sideways during the rotation of the nut 26, which helps ensure proper sealing, and thus is preferred over a non-captive seal arrangement. Seal 24 being captive with the tongue 25 and groove 51 arrangement allow nut 26 to be rotated independently of seal 24, and prevents the seal from moving sideways out of groove 51, but allows the seal to be intentionally removed such as to choose a different type of seal 24, or to replace a defective seal.

Nut 26 comprises a rigid elongated tubular structure which is preferably made of rigid plastics for cost and shipping weight considerations, and for the resistance to plastics corroding in water, although it could be made of other materials such as metal, and nut 26 can be injection molded or machined from a block of material, or can be manufactured with a combination of molding or casting and machining. Nut 26 is a tubular structure having an open or hollow passage 42 for allowing the free passage of a pipe or pipe structure 14 through the hollow passage 42. The hollow passage 42 is preferably about the same open diameter as that of hollow passage 34 of body 22 so as to be substantially larger than the exterior diameter of the passing pipe, and thus allow the pipe to pass at an angle as can be ascertained from FIG. 5. The hollow passage 42 is defined by an annular wall 44 having threads 46 on the interior thereof for engaging the threads 39 on wall 36 of body 22. Threads 46 can be located in a enlarged interior diameter portion in nut 26 so that when body 22 is threadably engaged therewith, the passage through the center of the body 22 and nut 26 is generally smooth and straight as shown in FIG. 3. What is considered the first end of annular wall 44 is shown unthreaded for a short distance on the inside of the nut, and on the outside is an annular surface 48 positioned oppositely from the inside unthreaded area of wall 44. Surface 48 provides a surface about which the large diameter end of rubbery boot 27 is positioned and sealingly clamped about, and may be a slightly reduced diameter portion as shown in FIG. 3 to provide an abutment stop shoulder for the large end of boot 27. At what is considered the second end of annular wall 44 is a connected laterally and outwardly extending annular flange 50 as previously mentioned. Flange 50 is preferably integrally connected to wall 44 in the manufacturing of nut 26, but conceivably could be connected such as by welding or using adhesives in a secondary step. Flange 50 connected at the second terminal end of wall 44 extends laterally a sufficient distance outward to serve as a press-plate to press against circular seal 24 and to press the circular seal 24 against the structure wall 12 as shown in FIG. 3 where the wall 12 is sandwiched between flange 38 of body 22 and seal 24. Flange 50 has a larger diameter than hole 16 so that the flange 50 will not pass through the hole 16. The outer periphery of flange 50 is shown without extending knobs, but instead the extending knobs 52 useful for grasping by hand or with a wrenching or holding hand tool when tightening the threaded engagement between the threads 39 of body 22 and the threads 46 of nut 26 are shown connected on the outer surface of annular wall 44. Threads 46 start at the back end of nut 26, adjacent and inward of flange 50, and extend forward toward the front end or toward surface 48 for a sufficient distance to allow the threaded engagement of body 22 with nut 26 so that the members 22 and 26 can be rotated and threadably brought toward one another sufficiently to compress or sandwich even a very thin structure wall 12 between flanges 38 and 50, with circular seal 24 properly installed, and if threads 46 are long enough toward surface 48 to allow flange 38 to be rotated inward toward flange 50 to abut the flange 50, then proper sealed connection of the tubular fitting assembly, i.e., body 22, circular seal 24 and nut 26 can be made with thin structure walls 12. A length of wall 36 of body 22 of about one inch will allow a hole 16 in a thick structure wall 12 to be sealed, however this is only for example as the length of wall 36 and threads 39, as well as wall 44 and threads 46 can be varied within the scope of the invention. The walls 36 and 44 supporting threads 39 and 46 respectively, are not tapering such as is common with threaded plumbing pipes and fittings wherein the plumbing threads create the fluid seal. The material of which nut 26 is manufactured should be impervious to the passage of water, should be strong and long lasting, should be durable in the application anticipated temperature range, and should be resistant to deterioration by, and the passage of, any chemicals or agents anticipated to come into contact with the nut 26. For use such as with gasoline and diesel petroleum products, nut 26 can be formed of acetal based material, although other suitable materials can be used.

The material of which rubbery boot 27 is manufactured should be impervious to the passage of water, should be strong (not easily torn or punctured) and long lasting, flexible and resilient, should be durable in the application anticipated temperature range, and should be resistant to deterioration by, and the passage of, any chemicals or agents anticipated to come into contact with the rubbery boot 27. Boot 27 is manufactured of rubbery materials, and preferably a thermoplastic elastomer for allowing precision and low cost manufacturing thereof utilizing plastics injection molding, although other molding processes and rubbery material could be used. Rubbery boot 27 is preferably made of one piece, or in other words all walls and panels are integrally formed connected to one another, and this for economy in manufacturing and for rendering any seams which could conceivably be used, absent from the structure, and thus not a location for potential separation and leaks. For use such as with gasoline and diesel petroleum products, boot 27 can be formed out of rubbery material sold under the tradename of ALCRYN by the E. I. Du Pont Company, although other suitable materials can also be utilized. The wall thicknesses of boot 27 can be altered within the scope of the invention, but are generally thin in most areas, particularly in and around material reservoir 70, for example between about 1/16 and 1/8 inch thick will normally function well when formed of ALCRYN, so as to provide the desired strength, flexibility, and a degree of elasticity. Rubbery boot 27 generally comprises the large annular end for sealed engagement to the front or first end of the tubular fitting assembly or specifically the area 48 of nut 26, and the smaller diameter pipe-engaging round hollow tube 54 portion, with a flexible curved material fold defining a material reservoir 70 connecting between the large end of the boot and the back end 68 of the tube 54. The material reservoir 70 or fold, as well as the back end 68 of tube 54 are preferably positioned inside the large pipe passage of the tubular fitting assembly as shown in FIG. 3 when the boot 27 is connected thereto and in a normal or relaxed position, and this to provide a short multiple purpose entrance seal useful in limited space locations. Tube 54 includes a front endward region 56 having on its outer surface an encircling first clamp placement area 58, a second clamp placement area 60, a space 62 between the two clamp area 58 and 60, preferably with raised ridges 64 on the outer side regions of clamping areas 58 and 60 for clearly indicating a proper clamping area or position to apply hose clamps 28 and 30 respectively. For air pressure testing as mentioned above, an optional normally closed inner-tube or tire style air input valve 66 is attached in space area 62, an air input end of the valve 66 is exposed on the outside of tube 54, and the valve 66 includes an air directing passage into the interior, through a small aligned and otherwise sealed hole in the annular wall defining tube 54 so that when a pressurized air source is connected to the exposed outer end of air valve 66, the valve is opened and air is input into the center of tube 54. As can be ascertained in FIGS. 1 and 4, if an open end of a secondary pipe 20 terminates in space 62, and clamps 28 and 30 are applied and tightened against the outer surface of tube 54, with clamp 28 sealing tube 54 about a further extending primary pipe 18, and clamp 30 sealing tube 54 about secondary pipe 20 adjacent the terminal end of pipe 20, then air input through air valve 66 can flow into the open end of secondary pipe 20 only, assuming there are no unwanted leaks, and assuming the opposite end of pipe 20 is sealed, a pressure test can be applied to verify the integrity of the secondary pipe 20. It can be seen in FIG. 1 that the front end of tube 54 is positioned relatively near structure wall 12 to position area 62 over the terminal end of a secondary pipe 20 cut-off relatively close to structure wall 12, and in FIG. 4 it can be seen that the front end of tube 54 has been pulled, and manually so, a substantial distance outward from structure wall 12 to position area 62 over the terminal end of a secondary pipe 20 cut-off or positioned a relatively far distance outward from structure wall 12, and the ability of tube 54 to be pushed inward toward structure wall 12, or pulled outward a substantial distance from structure wall 12 is a significant advantage. Clearly, after the air pressure testing using valve 66 has been performed on the secondary pipe 20 in FIG. 4, the tube 54 can be left precisely in place to permanently seal the open terminal end of the pipe 20, or alternatively, the end of tube 54 can be repositioned toward structure wall 12 after having loosened clamps 28 and 30, and once repositioned, one or both of the clamps 28 and 30 again tightened to leave pipe 20 capable of draining at its now exposed open terminal end, which is the circumstance shown in FIG. 5. Also shown in FIG. 5 is the pipe structure 14 passing through the structure wall of a manhole 40 at a downward angle, the piping then connecting to a pump 43 for pumping chemicals from the underground tank 41. Boot 27 should be provided in embodiments having air valve 66, and in embodiments not having air valve 66 to be used simply as an entrance seal or a termination reducer, since it is not necessary to have an air test valve 66 on each of two oppositely disposed ends of a single pipe, and some may not wish to pressure test. Pressure testing is not normally performed on electrical conduits.

Figure 4:
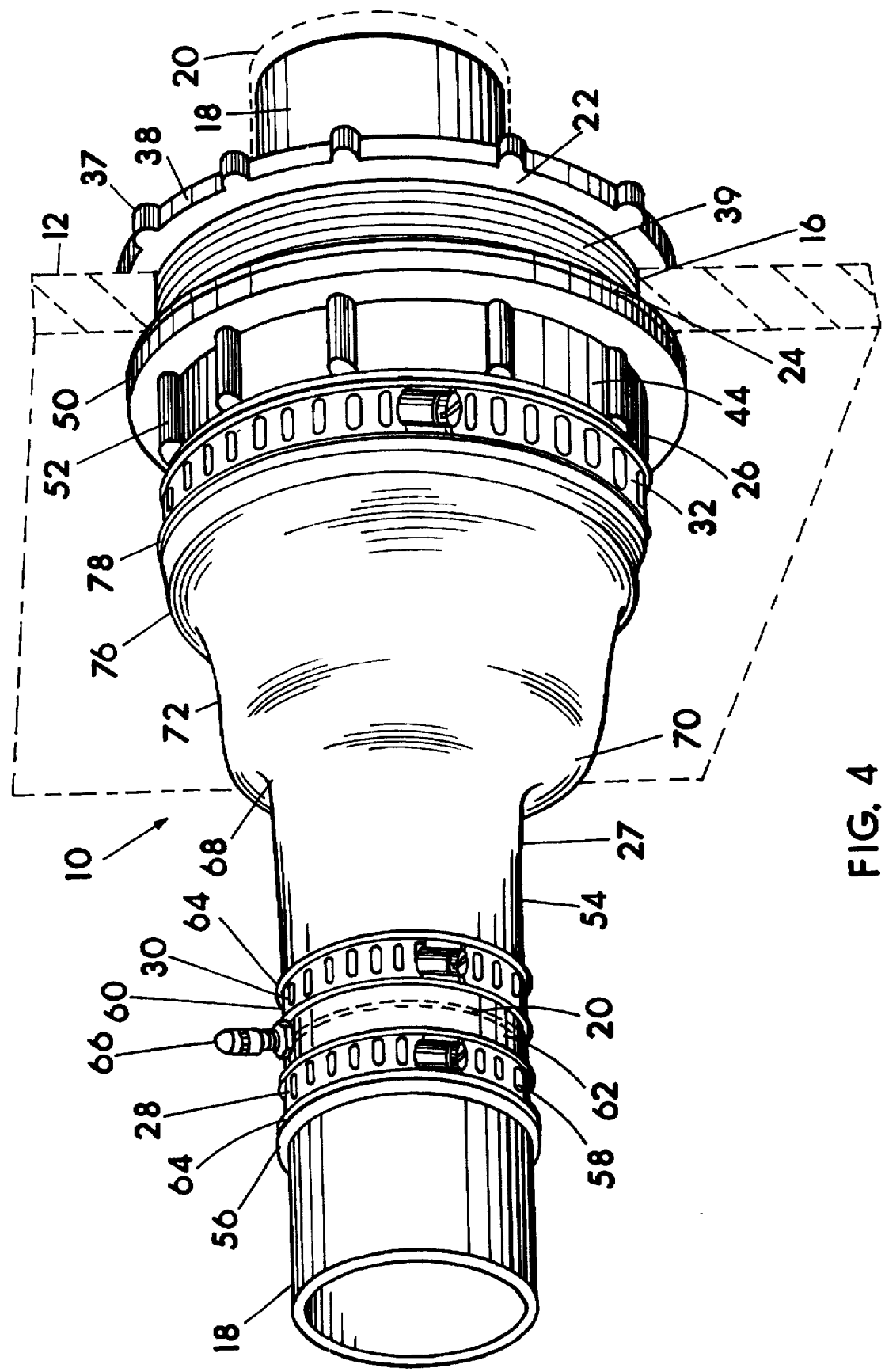
FIG. 4 is an illustrative perspective view of the preferred embodiment of FIG. 1 used on a structure wall, and affixed over a pipe at the junction of a structure wall penetration. The rubbery boot is shown fully extended.

As shown in FIG. 3, the somewhat elongated tube 54 normally extends forward beyond the front end of nut 26 about half the length of the tube 54, and the back end 68 of tube 54 is positioned inside the tubular fitting assembly of body 22 connected to nut 26. For example only, a tube 54 having an internal diameter of approximately 2½ inches might be about 4 inches in length between front end 56 and back end 68. Tube 54 is connected and suspended centrally of body 22 and nut 26 preferably by being integral molding to the curved-fold of the boot material defining the flexible and resilient material reservoir 70. The open passages 34 and 42 of body 22 and nut 26 respectively, are normally aligned with the central open passage of tube 54, although for sealing about a pipe passing through a structure wall 12 at an angle, the central open passage and annular wall defining same of tube 54 follows the pipe angle, the tube being force to angularly follow the pipe since the pipe is a more stiff structure than the tube 54 and its supporting curved material fold defining material reservoir 70. The curved-fold defining material reservoir 70 first curves outward from back end 68, and is annular about the entire back end 68 of tube 54. The material defining reservoir 70 curves outward away from the hollow center of tube 54, extends a distance outward from back end 68 of tube 54, and then turns or sweep approximately 90 degrees to then extend in a spaced relationship from back end 68, defining open space 74, extending in a parallel plane to the annular sidewall of tube 54, and extending toward front end 56 of the tube 54 with a wall portion designated wall 72. Wall 72 is annular, and encircles the back end of tube 54 and in spaced relationship thereto. The space between the outer surface of back end 68 of tube 54 and wall 72 is space 74. The curve of the material shown at 70 in FIG. 3 sweeps outward and curves approximately 180 degrees between the back end 68 of tube 54 and wall 72, and then the material again turns outward approximately 90 degrees at the forward most end of wall 72, and extends outward a short distance defining end wall 76 which defines an end wall to groove 80 which is fully defined by the material again turning approximately 90 degrees and extending a distance toward the back end of the boot 27, extending parallel to wall 72 and the back end 68 of the annular wall defining tube 54, in space relationship to wall portion 72, and hence defining the groove 80 and a large clamp area 78 prior to terminating. Groove 80 is defined between the inward or underside of the material defining large clamp area 78 and the outer surface of wall portion 72, and groove 80 receives the front end 48 of wall 44 of nut 26, followed by applying large hose clamp 32 about the outer surface of boot 27 in clamp area 78, whereby with tightening of the clamp 32, the back end of the boot 27 is sealingly engaged to nut 26, and when boot 27 and material reservoir 70 are normal, i.e., relaxed as if resting normally on a shelf, the back end 68 of tube 54, material reservoir 70 and wall portion 72 are within the open passage 42 of nut 26 as shown in FIG. 3. Also as shown in FIG. 3 using broken lines for illustrative purpose to show some of the inward and outward movement capabilities of boot 27, it can be seen that tube 54 can be manually pushed inward toward structure wall 12 wherein wall portion 72 in effect becomes longer toward structure wall 12 by way the relatively thin rubbery material defining material reservoir 70 moving or rolling toward the interior wall surface of body 22 and nut 26 to a degree, and also with some stretching occurring, and this material moving or shifting is being replaced to a degree by material from back end 68 of tube 54 rolling into the curvature of material reservoir 70, with tube 54 becoming slightly shorter in effect as some of the back end 68 material of tube 54 is in effect rolled outward to define the first or inward portion of the material reservoir 70. When the back end of boot 27 is secured in place for use, tube 54 can be pulled outward away from structure wall 12. The front end of tube 54 can be grasped by hand and pulled forward, such as to locate area 62 over a terminal end opening of secondary pipe 20, drawing with it material from the curved-fold area defining the material reservoir 70, and the material drawn from material reservoir 70 is replaced to a degree by wall portion 72 moving or rolling into the curved-fold as the material reservoir 70 provides material moving forward away from structure wall 12. This material moving or rolling out of the curved-fold at 70 straightens out somewhat to match somewhat the shape of the annular wall defining tube 54, and as wall portion 72, or the portion thereof closest to structure wall 12 moves or rolls somewhat in a sweeping curve into the curved-fold of material defining the material reservoir, and wrinkling and kinking in the material curved-fold area is not great due to the curved shape of the material at 70, and the spacing 74. From FIGS. 3 and 5, it can be ascertained that due to space 74, which may be about 1 inch wide when tube 54 is about 2½ inches in internal diameter, and the flexibility and supply of material at material reservoir 70, pipe-engaging tube 54 can be positioned at an angle relative to the opening of body 22, and this without any significant forces which would tend to cause significant deformation in the annular wall defining tube 54, as it should be appreciated that material reservoir 70 on one side of boot 27 can be pulled forward at the same time that the opposite side of material reservoir 70 across from the pulled forward side is pushed rearward, as happens when tube 54 is positioned at an angle as shown in FIG. 5. In FIG. 4, tube 54 is shown pulled outward the maximum distance, wherein with this extreme but possible extension, space 74 and the curved-fold defining material reservoir 70 have been basically eliminated, and wall portion 74 and end wall 76 have been drawn outward to the point of now facing outward away from the pipe 14 centerline or lengthwise axis, and extending in general parallel alignment with the length of the pipe 14. The extreme forward extension of boot 27 in FIG. 4 would be rarely used, as most typically, boot 27 will remain shaped as shown in FIGS. 1 and 3, and moved inward and outward simply by rolling material reservoir 70 forward and rearward, and the forward and rearward movement capability of the front end 56 of tube 54 will be sufficient to locate the tube 54 covering the terminal end of a secondary pipe 20 with area 62, and further allowing front end 56 to be pushed back toward structure wall 12 to be able to tighten hose clamp 28 onto secondary pipe 20, thus leaving the open terminal end of the secondary pipe 20 open, and capable of draining therefrom as in FIG. 5. On pipes in the 1½ to 3 inch size ranges, and considering or assuming hose clamps 28 and 30 are approximately ½ inch wide, and area 62 is also about ½ inch wide, this forward and rearward movement capability of tube 54 should be a minimum of approximately 1 inch, although greater movement range is highly preferred and is provided in the example of the invention shown for allowing the installer to work more quickly by way of not having to measure and calculate to a high degree of accuracy the termination location of the secondary pipe 20 outward of structure wall 12.

Clamp area 78 on boot 27 is sealingly secured about area 48 of nut 26 by the encircling hose clamp 32. Hose clamp 32 is an adjustable diameter band made of materials not subject to corrosion by any agents anticipated to come into contact with the clamp 32. Hose clamps 28, 30 and 32 are all preferably corrosion resistant metal worm gear drive hose clamp type adjustable bands. Hose clamp 32 can be manually expanded in diameter such as by using a screw driver or socket wrench to allow the initial installation of the clamp, or its subsequent removal, and it can be reduced in its diameter to constrict the appropriate area of boot 27 tightly onto nut 26. Clamps 28 and 30 can be identical to one another, and the same only smaller than clamp 32.

For example only, and for possibly improved clarity, if tube 54 has an internal open diameter of about 2½ inches, space 74 can be about 1 inch wide, and the aligned open passages 34 and 42 of body 22 and nut 26 respectively can be about 4¾ inches across, and body 22 can be sized to fit into a 5 inch diameter hole 16 in structure wall 12. The overall length of the assembled body 22 and nut 26 can be about 2 to 3 inches measuring out from structure wall 12, as it should be appreciated that if nut 26 extends a great distance outward from structure wall 12, then a pipe extending through the seal 10 at an angle will be further restricted in its possible angle because the angular pipe will abut the front interior wall of nut 26. Additionally, a tube 54 having an interior open diameter of about 2½ inches normally will be sealable about pipes ranging in size approximately from 2 to 3 inches nominally, and this due to the flexible and stretchy nature of the rubbery material from which boot 27 is formed. The ability of a single diameter of tube 54 to accept substantially varying pipe diameters not only makes it more versatile by allowing it to be used on differently sized pipes, but it allows it to be tightly sealed about a primary pipe 18 and about a larger secondary pipe 20 at the same time. As shown in FIG. 3 in broken lines near front end 56, tube 54 can have a stepped reduced diameter starting in about the forward end of space 62 to provide a reduced diameter clamp area 58, wherein clamp area 58 is reduced in diameter compared to clamp area 60, and this to allow use of boot 27 with a primary pipe 18 which is substantially smaller than an associated secondary pipe 20. Tube 54 and its internal open diameter can be fashioned or manufactured slightly larger or significantly smaller absent the requirement of changing the size of nut 26 and body 22, although space 74 and material reservoir 70 will be altered in size in changing the size of tube 54 so that the tube 54 will either seal against smaller or larger diameters of pipes. I do not recommend space 74 between the exterior surface of tube 54 adjacent back end 68 and the inward surface of wall portion 72 of boot 27 or the interior diameter of nut 26 and body 22 to be less than approximately 10% of the exterior diameter of the largest pipe to be inserted in tube 54, the largest pipe being about the interior diameter of the tube 54 adjacent the back end 68 thereof, otherwise the steepness of the angle at which the pipe can pass through the entrance seal 10 will be overly restricted. A space 74 of a wider distance than 10% of the largest diameter pipe to be inserted into tube 54 is preferred for reasons which should be clear at this point in the description. Body 22, circular seal 24 and nut 26 can of course be made in larger and smaller scales, as can boot 27, and so the dimensions herein given in inches are only for example and should not be used to overly restrict the invention.

An optional feature, which is not shown in the drawings, for use primarily in underground construction wherein the ditch back-fill is particularly rocky with sharp edged rocks, and wherein flange 38 of body 22 would be on the outside of structure wall 12 and buried, which is it primary designed use location, is a rock-excluder ring preferably made of flexible and resilient material that can be fairly tightly fitted encircling a pipe, and can be slid up the pipe and pushed against flange 38 of body 22 prior to back-filling the ditch, with the excluder having a major diameter sufficient to generally seal, at least against most rocks, the spacing between the pipe passing through seal 10 and the internal diameter of body 22, with this excluder helping to prevent rocks and the like hard objects from entering in the interior of boot 27 whereat the rocks could puncture the boot 27, particularly with ditch-settling or movement in an earthquake.

Thus from the above descriptions, it can be seen that with circular seal 24, nut 26, boot 27, and hose clamps 28, 30 and 32 all positioned in use inside an accessible area, such as inside a manhole or dispenser pan or sump, all of these parts can be replaced if necessary without having to un-earth the buried pipe or the backside of the penetrated structure wall, the replacement generally only requiring the freeing of the end of the pipe within the manhole to be able to slide the replacement parts over the free end of the pipe. Although body 22 as herein described cannot be replaced such as from within the manhole, the body 22 when manufactured of rigid, strong and durable materials not quickly corroded by any agents anticipated to possibly come into contact with the body, the body 22 should last for many years, and possibly easily 50 to 100 years, or at least as long as the other components of the chemical storage and distribution system such as the tank, the manhole, the dispenser pan/sump and the like which would require un-earthing to replace, and thereby provide the opportunity to replace the body 22, which I anticipate will still be fully functional at that time.

It is believed at this point in the description that those skilled in the art should be readily able to build and use at least one structural embodiment in accordance with the present invention without having to resort to undue experimentation.

Although I have very specifically described the preferred structures and uses of the invention, it should be understood that the specific details are just that, "preferred" structures given for example to those skilled in the art. Changes in the specific structures described can clearly be made without departing from the scope of the invention, and therefore it should be understood that the scope of the invention is not to be overly limited by the specification and drawings given for example.

What I claim as my invention is:

1. An adjustable entrance seal for placement around a pipe when passing through a hole in a structure wall; said entrance seal comprising a combination of, a tubular body having an annular sidewall in-part placeable within a hole in a structure wall for sleeving the hole; said annular sidewall of said body defining a passage for a pipe to pass through said body; said annular sidewall of said body having threads thereon; said body having an outwardly extending abutment member for abutting a first side of the structure wall and preventing complete passage of said body through the hole in the structure wall; said body having a first end of said annular sidewall away from said abutment member for locating said first end positioned on a second side of the structure wall;

a rubbery seal about said annular sidewall of said body for sealingly engaging the second side of the structure wall about the hole;

a tubular nut member having a threaded portion threadably engaged with said threads of said body; said nut member including an annular sidewall defining a passage aligned with said passage of said body for allowing a pipe to pass through said nut member and said body; said nut member having an annular flange for abutting said seal for compressing the seal tightly against the second side of the structure wall so as to sandwich the structure wall between said flange of said body and said seal; said nut member having a first end for engaging a reducer boot substantially of rubbery material and including a large annular end secured sealingly about said first end of said nut member by a relatively large adjustable band-clamp; said reducer boot having a relatively small diameter tube defining a passage for a pipe to pass through said tube; said tube suspended in-part within said large annular end of said reducer boot by a flexible curved material fold connecting between a rearward end of said tube and said large annular end of said reducer boot; the passages of said body, said nut member and said tube all aligned to allow a pipe to pass through the aligned passages;

said rearward end of said tube having a significantly smaller exterior surface diameter relative to the passages through said body and said nut member;

an annular space between the exterior surface of said tube and the annular sidewalls of said tube and said nut member;

the flexibility of said curved material fold connecting between said rearward end of said tube and said large annular end of said reducer boot in combination with said annular space allowing for said tube to be substantially alterable in position in three degrees of freedom relative to said body and said nut member;

at least a first relatively small adjustable band-clamp about a front end of said tube for compressing and sealingly engaging said tube about a pipe.

2. An adjustable entrance seal according to claim 1 wherein a width of said annular space is equal in distance of at least 10 percent of the exterior diameter of the largest pipe acceptable by said tube.

3. An adjustable entrance seal according to claim 2 wherein said flexible curved material fold curves approximately 180 degrees from said rearward end of said tube toward said large annular end of said reducer boot.

4. An adjustable entrance seal according to claim 3 further including a second relatively small adjustable band-clamp about said tube.

5. An adjustable entrance seal according to claim 4 further including an air input valve connected to said tube between the two relatively small adjustable band-clamps.

6. An adjustable entrance seal for placement around a pipe when passing through a hole in a structure wall; said entrance seal comprising a combination of, a tubular fitting means for sleeving and sealing about a hole in a structure wall; said tubular fitting means defining a relatively large diameter passage through which at least one pipe can be passed;

a rubbery reducer boot including a substantially reduced diameter tube defining a passage generally aligned with said large diameter passage of said tubular fitting means through which at least one pipe can be passed;

said rubbery reducer boot having a large end sealingly engaged with said tubular fitting means;

a rollable curve flexible means connecting between said tube and said large end of said rubbery reducer boot for allowing angular repositioning of said tube relative to said tubular fitting means, and further for allowing said tube to be moved substantially and at least one inch inward and outward relative to said tubular fitting means;

adjustable compression means about said tube for compressing and sealingly engaging said tube about at least one pipe.

7. An adjustable entrance seal according to claim 6 wherein said adjustable compression means comprises at least two adjustable band-clamps in spaced relationship to one another and placed about said tube.

8. An adjustable entrance seal according to claim 7 wherein an air valve is connected to said tube between said at least two adjustable band-clamps.

9. An adjustable entrance seal according to claim 8 wherein said tubular fitting means comprises;

a rigid tubular body having an annular sidewall with a rubbery fluid seal about said annular sidewall of said body, said body having a flanged end for abutting the structure wall about the hole in the structure wall, and threads on said annular sidewall of said body engaged with threads on a sidewall of an elongated tubular nut, said tubular nut having a first end in sealed engagement with said large end of said rubbery reducer boot.

10. A multiple purpose adjustable entrance seal for placement around and sealing about a pipe structure when passing through a hole in a structure wall, and for serving as a termination reducer seal between a secondary pipe and a primary pipe of the pipe structure; said multiple purpose adjustable entrance seal comprising a combination of, a rubbery reducer boot with a large diameter opening at one end, means for sealing about a hole in a structure wall and for mounting an annular wall defining said large diameter opening of said rubbery reducer boot over the hole, said rubbery reducer boot having a relatively small diameter tube defining a passage aligned with the hole for the pipe structure to pass through the hole and at least enter said tube; said tube connected to said annular wall of said rubbery reducer boot by at least one flexible curved shaped material member connecting between a rearward end of said tube and said annular wall of said rubbery reducer boot;

the flexibility and shape of said at least one flexible curved shaped material member connecting between said rearward end of said tube and said annular wall of said rubbery reducer boot allowing for said tube to be substantially alterable in position in three degrees of freedom relative to the structure wall;

adjustable compression means about said tube for compressing and sealingly engaging said tube about a secondary pipe and a primary pipe.

11. A multiple purpose adjustable entrance seal according to claim 10 wherein said adjustable compression means comprises at least two adjustable band-clamps in spaced relationship to one another and placed about said tube.

12. A multiple purpose adjustable entrance seal according to claim 11 wherein an air input valve is connected to said tube between said at least two adjustable band-clamps.

13. A multiple purpose adjustable entrance seal according to claim 12 wherein said means for sealing about the hole in the structure wall and for mounting said annular wall defining said large diameter opening of said rubbery reducer boot over the hole comprises a tubular fitting assembly.

14. A multiple purpose adjustable entrance seal according to claim 13 wherein said tubular fitting assembly comprises a rigid tubular body having an annular sidewall with a rubbery fluid seal about said annular sidewall of said body, said body having a flanged end for abutting the structure wall about the hole in the structure wall, and threads on said annular sidewall of said body engaged with threads on a sidewall of an elongated tubular nut, said tubular nut having a first end in sealed engagement with said annular wall defining said large diameter opening of said rubbery reducer boot.

15. A multiple purpose adjustable entrance seal according to claim 14 wherein said body and said tubular nut are both formed of rigid plastics; and said rubbery reducer boot is formed of a thermoplastic elastomer.

16. A multiple purpose adjustable entrance seal according to claim 15 wherein said rubbery fluid seal and said tubular nut are abutting one another and positioned on a single side of a structure wall when in use about a pipe structure.

17. A multiple purpose adjustable entrance seal according to claim 16 wherein said rubbery fluid seal is laterally captive in a groove in an annular flange of said tubular nut, and intentionally removable from said groove to allow replacing of said rubbery fluid seal.

18. A multiple purpose adjustable entrance seal according to claim 17 wherein said tube being substantially alterable in position in three degrees of freedom relative to the structure wall includes said tube capable of being moved upward and downward; left and right; and toward and away relative to the structure wall; wherein said toward and away is at least a minimum of two inches of travel in each direction.

19. A multiple purpose adjustable entrance seal according to claim 18 wherein said tubular fitting assembly requires only a single hole in a structure wall for mounting said tubular fitting assembly.

20. A multiple purpose adjustable entrance seal according to claim 19 wherein said annular wall defining said large diameter opening of said rubbery reducer boot is sealingly engaged about said first end of said tubular nut and removably retained in place by an adjustable band clamp.

* * * * *